United States Patent [19]

Carbonell Serra et al.

[11] Patent Number: 4,610,396

[45] Date of Patent: Sep. 9, 1986

[54] PROCESS FOR THE TREATMENT OF MUNICIPAL REFUSE AND PLANT FOR ITS EXECUTION

[76] Inventors: Enrique Carbonell Serra, Ronda General Mitre, 63, Barcelona, Spain; Daniel Boudry, 66, chemin de Conches, 1231 Conches, Switzerland

[21] Appl. No.: 568,119

[22] Filed: Jan. 4, 1984

[30] Foreign Application Priority Data

Jan. 10, 1983 [ES] Spain .................... 518876

[51] Int. Cl.$^4$ ............................. B02C 21/00
[52] U.S. Cl. ....................... 241/24; 241/29; 241/31; 241/76; 241/DIG. 38
[58] Field of Search ............ 241/DIG. 38, 24, 31, 241/20, 19, 29, 76, 77, 78, 79, 55; 209/3, 12

[56] References Cited

U.S. PATENT DOCUMENTS

| | | | |
|---|---|---|---|
| 3,682,396 | 8/1972 | Whitney et al. | 241/55 X |
| 3,817,458 | 6/1974 | Gilberto | 241/DIG. 38 X |
| 3,848,813 | 11/1974 | Stanczyk et al. | 241/19 |
| 3,876,157 | 4/1975 | McIntire et al. | 241/17 |
| 4,044,956 | 8/1977 | Benedetto et al. | 241/DIG. 38 X |
| 4,079,837 | 3/1978 | Grube et al. | 241/DIG. 38 X |
| 4,098,464 | 7/1978 | Niedner et al. | 241/24 |
| 4,341,353 | 7/1982 | Hamilton et al. | 241/DIG. 38 X |
| 4,479,581 | 10/1984 | Kelyman | 209/3 |

FOREIGN PATENT DOCUMENTS

2939743 2/1981 Fed. Rep. of Germany .

Primary Examiner—Mark Rosenbaum
Attorney, Agent, or Firm—Stevens, Davis, Miller & Mosher

[57] ABSTRACT

A process and plant for mechanical treatment of municipal refuse, including transformation and subsequent reuse of various directly or indirectly usable products. The process permits complete separation of the combustibles, vegetable matter, hard plastics, PVC, ferrous scrap and inert substances, and includes the following steps, starting from the receiving pit: tearing open the sacks containing the municipal refuse and thoroughly mixing the slime; charging a treatment line wherein the combustible, vegetable matter, hard plastics, PVC and glass bottles fractions undergo primary separation; collecting some of the separated products as directly usable products; and routing the remainder of the separated products to lines for treatment of the various fractions contained therein.

11 Claims, 6 Drawing Figures

PROCESS FOR THE TREATMENT OF MUNICIPAL REFUSE AND PLANT FOR ITS EXECUTION

SUMMARY OF THE INVENTION

A process for treatment of municipal refuse which permits complete separation of combustibles, vegetable matter, hard plastics, PVC, ferrous scrap, and inert substances. This process is carried out in a plant comprising the following systems, starting from the receiving pit:
(a) a system for shredding and mixing the municipal refuse;
(b) a system for feeding the treatment line, in which the combustibles, vegetable matter, hard plastics, PVC and glass bottles undergo primary separation; and
(c) a system for collecting the separated products and routing them to lines for treatment of
  (i) the combustible fraction
  (ii) the organic fraction
  (iii) the hard plastics and PVC
  (iv) the magnetic fraction.

THE INVENTION

The present invention refers to a process far and to the arrangement of a plant for, mechanical treatment of municipal refuse, consisting in the transformation and subsequent re-use of various directly or indirectly usable products.

These produces include a fuel of high calorific value processed in pellet form and organic manures with good fertilizing properties.

This process also permits simultaneous recovery of ferrous scrap, crushed plastics and PVC, glass classified on the basis of colour, and other non-ferrous materials.

The said process begins at the refuse receiving pit. From this point of departure, the materials are routed to the circuits shown on the diagram below.

Depending on the nature of the products to be recovered or transformed, circuits may be added or eliminated, together with their specific equipment, without modifying or impairing the basic principles of the process.

It should be noted that the entire treatment process and the requisite equipment comply with national regulations and standards concerning safety and environmental protection.

For this reason, all processing operations are conducted and raw and recovered materials stored inside a closed, covered shed.

Fermented air, heavily laden with odours and dust particles, is removed directly by suction from the various sites at which these nuisances are produced, and subsequently conveyed to hot-air generators which supply rotary driers. This solution therefore eliminates the obnoxious smells produced by fermentation of the refuse in the receiving pit.

This dust-laden air passes through a highly efficient decantation cyclone. The extracted dust particles are piped to a purification cyclone, from which they are transported by a screw conveyor to a storage silo for the fuel which drives the hot-air generators in the combustible fraction treatment line.

The liquid-collecting network comprises three distinct systems:
(1) the system for collection of liquid manure and ooze from the receiving pit. These liquids are conveyed to a tank reserved for that purpose; (2) the system for collection of waste water from the factory, which is conveyed to another tank reserved for that purpose; and (3) the system for collection of rain water, which is conveyed to a third tank serving as a reservoir for firefighting purposes.

SCHEMATIC DIAGRAM OF THE PROCESS

BRIEF DESCRIPTION OF THE FIGURES

For a fuller understanding of the explanations below, reference should be made to the attached figures, which illustrate the process and show the various components of the plant, their location in the processing line, and by means of arrows, the circuit followed by the different solids, liquids and gases during treatment of the refuse.

These figures illustrate in detail the different phases of the treatment process and show clearly the various connections between the individual components of a typical plant for execution of the process.

It should be noted that these figures do not restrict the invention to its diagrammatic representation, and that all kinds of modifications may be introduced to suit particular requirements.

Since the treatment of the organic fraction during prefermentation and fermentation is not the object of the present invention, only a few details of the relevant unit are shown in FIG. 5. However, this equipment is involved in the drying and refining of the organic fraction or compost.

Its continuation is shown in FIG. 6, which illustrates all the equipment concerned with pelletization of the pure or enriched compost and sacking of the finished product.

DETAILED DESCRIPTION OF THE INVENTION

The above-mentioned figures and explanations make reference to storage of the refuse and charging of the treatment line.

Figure 1:
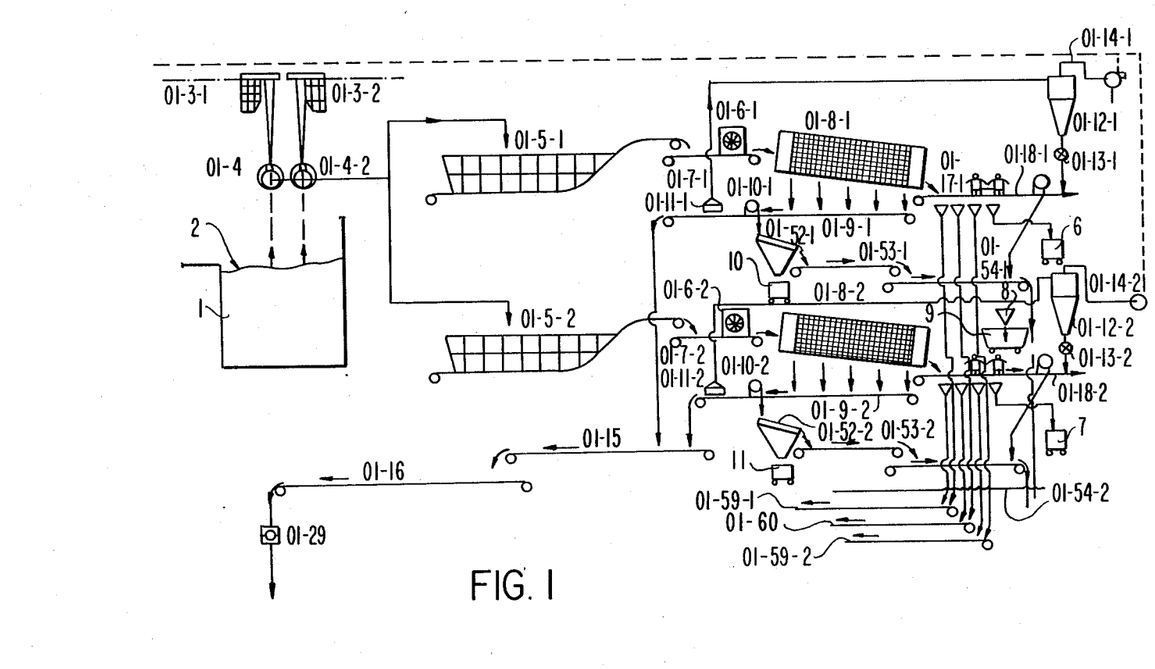
FIG. 1 shows the reception and storage of the refuse and charging of the various treatment lines. It also depicts the primary classification, consisting in the treatment of the heavy fraction, removal of PVC, hard plastics and glass bottles by hand-picking, and magnetic separation of the ferrous metals.

The receiving pit houses two identical silos separated by a space in which two feeders, one for each treatment line, are located.

These feeders are charged initially by two travelling cranes with grappling hooks, which also manipulate the refuse discharged into the pit by (2).

The travelling cranes also distribute the refuse evenly in the pit and prevent it from piling up in heaps as it is discharged by the dump trucks. This method of handling the refuse ensures that the unloading zones immediately below the doors are kept clear, and mixes the refuse by spreading it in uniform layers.

Each pit has a sloping floor whose lowest point is located opposite the doors. The ooze from the refuse runs down these slopes into a collector forming part of the system for selective recovery of the ooze. The pit is housed in a closed shed.

The evil-smelling, dust-laden air in the receiving pits is extracted through orifices in the upper section opposite the opening through which the dump trucks discharge. This air is used to feed the generators of the driers, thus preventing its escape.

As shown in FIG. 1, each travelling crane with grappling hooks (01-3-1 and 01-3-2) can charge the respective feeders (01-5-1 and 01-5-2) at the head of each of the two main lines. It should be noted that the said cranes operate independently of each other.

PRIMARY SORTING

The main feeders (01-5-1 and 01-5-1) discharge their contents into the shredders (01-6-1 and 01-6-2), whose function is to tear the sacks open and mix the refuse thoroughly, in order to facilitate sorting of the components in subsequent phases.

The shredders are of fireproof construction to obviate the risk of explosion. The lower section of each shredder is connected to a metallic conveyor (01-7-1 and 01-7-2), whose function is to absorb any shocks generated by operation of the shredder.

The said conveyors feed the revolving screens (01-8-1 and 01-8-2), whose function is to effect the basic separation between the combustible fraction and the organic fraction.

This screen has 150 mm apertures to ensure highly efficient separation of the combustible fraction, which will later be purified. The material passing through the screen consists mainly of organic substances.

TREATMENT OF THE HEAVY FRACTION

The material passing through the 150 mm apertures in the screens (01-8-1 and 01-8-2) falls onto the belts (01-9-1 and 01-9-2). Each belt is provided with a magnetic separator (01-10-1 and 01-10-2) which removes the ferrous metals. The belts are also provided with an extraction system which removes the light fractions. These are transported to the decantation cyclones (01-12-1 and 01-12-2). The air is extracted from these cyclones by fans (01-14-1 and 01-14-2). The heavier particles fall into the hoppers located below the cyclones, and are removed from the hoppers by rotary vane extractors (01-13-1 and 01-13-2) and relayed by the belts (01-17-1 and 01-17-2) to the crushers (01-19-1 and 01-19-2) (see FIG. 3).

The organic fraction recovered on the belts (01-9-1 and 01-9-2) is routed to the fermentation area by belts (01-15 and 01-16), passing through a clod-breaker (01-29) to facilitate storage before entering the biostabilizer.

The sorting operations on the residue on the screens (01-8-1 and 01-8-2) will now be dealt with in detail.

Glass PVC and heavy plastics are removed by hand-picking and are routed to the conveyor belts (01-59-1, 01-60 and 01-59-2). Magnetic separation of the ferrous metals directs the ferrous scrap to the belts (01-54-1 and 01-54-2), which in turn discharge it onto the belts (01-55-1 and 01-55-2) (see FIG. 2).

The residue on the screens (01-8-1 and 01-8-2) is also deposited on the belts (01-17-1 and 01-17-2) and the glass, PVC and plastics are removed from it by hand-picking. Unbroken glass bottles are classed according to colour and deposited in the two containers (6 and 7) reserved for that purpose.

Material unsuitable for inclusion in the combustible fraction is also removed and deposited in a special container (9). This material is then passed through magnetic separators (01-18-1 and 01-18-2), which remove any ferrous metals.

The organic fraction undergoes a similar operation involving magnetic separators (01-10-1 and 01-10-2), sizing screens (01-52-1 and 01-52-2), belts (01-53-1 and 01-53-2) and belts (01-54-1 and 01-54-2). The screens separate the bottle caps from the other ferrous scrap and deposit them in the containers (10 and 11). The materials are then conveyed to the crushers (01-19-1 and 01-19-2) (see FIG. 3).

HAND-PICKING

The residue on the screens (01-8-1 and 01-8-2) consists mainly on the so-called combustible fraction. This residue is deposited on slow-moving conveyors (01-17-1 and 01-17-2) and is hand-picked by two employees on each line. The purpose of this sorting operation is to separate the recoverable products, such as thick white and coloured plastics, PVC and glass, as well as the products to be eliminated, i.e. material unsuitable for inclusion in the combustible fraction.

Figure 2:
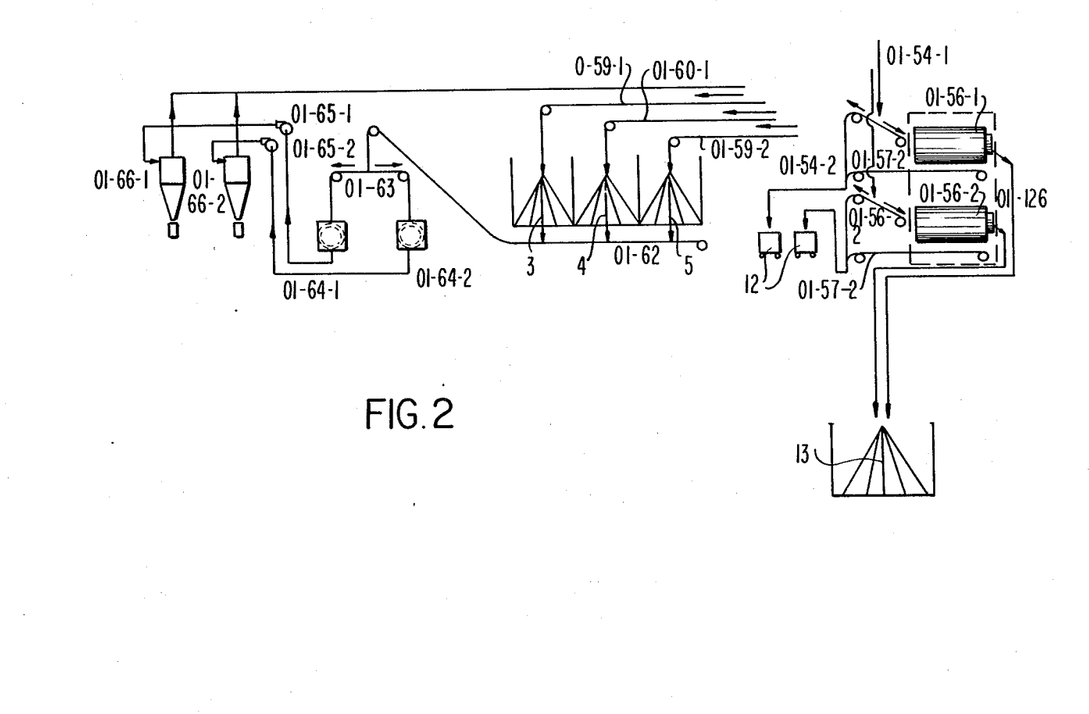
FIG. 2 shows the equipment required for the complementary and final treatment of the ferrous scrap, hard plastics and PVC.

The first three recoverable products are transported on conveyor belts (01-59-1, 01-60 and 01-59-2). These belts also convey the equivalent hand-picked products from both lines and deposit them in their respective storage areas (3, 4 and 5), from where a given treatment cycle, such as purification, crushing and sacking, may originate, as shown in FIG. 2.

The hand-picked glass bottles are collected in two containers (6 and 7), one on each line, and are suitable for resale.

The other material in both lines, unsuitable for inclusion in the subsequent treatment of the combustible fraction is thrown into a common hopper, which empties them into a separate container.

The hand-picking area is designed to facilitate the employees' task and to ensure high productivity. The material emerging from this hand-picking areas is conveyed on a sorting belt and the ferrous metals removed from it by magnetic separators (01-18-1 and 01-18-2).

TREATMENT OF THE MAGNETIC FRACTION

This phase of the treatment is carried out at two different points, namely on the organic fraction by means of the separators (01-10-1 and 01-10-2) and on the combustible fraction by means of the separators (01-18-1 and 01-18-2). The material extracted at these two points is deposited on the conveyor belts (01-53-1 and 01-53-2).

FIG. 2 shows the following operations: The ferrous scrap is unloaded onto the conveyors (01-53-1 and 01-53-2). It is then conveyed by the belts (01-54-1 and 01-54-2), which discharge it onto the belts (01-55-1 and 01-55-2) (see FIG. 2).

These belts are steeply inclined in order to facilitate gravitational separation of the ferrous scrap from any light objects still trapped in the magnetic fraction. These belts travel at a speed of approximately 3 m/s.

The heavy and magnetic objects will be separated and introduced into purification revolving screens (01-56-1 and 01-56-2), while the light objects will be transported by the belts and emptied by gravity into the containers (12). The lighter objects will be tipped from this screen onto the belts (01-57-1 and 01-57-2), which will deposit them in the containers (12) reserved for that purpose.

The various items for ferrous scrap treated in the revolving screens (01-56-1 and 01-56-2) are subjected to a process of attrition for a certain time to remove labels, printing ink, paint, etc. After this frictional cleaning, these items are suitable for resale.

The cleaned products are tipped successively into a receiving silo (13). As the noise generated by this operation would constitute an evident nuisance, the silo is housed in a soundproofed cabin.

TREATMENT OF THICK PLASTIC

This process is also illustrated diagrammatically in FIG. 2. The plastic removed from the combustible fraction by hand-picking is stored in the three silos (3, 4 and 5). Thick white plastic is stored in silo 3, thick coloured plastic in silo 4 and the PVC, composed mainly of mineral water bottles, in silo 5.

To be acceptable for resale, these plastics must be reduced to clean fragments and sacked. This operation is effected by means of the conveyor (01-62), which can be charged by any of the above-mentioned silos. This conveyor transports the material from the silos on a reversible belt (01-63), which feeds both mincing machines (01-64-1 and 01-64-2) (knife mills). Each mill is connected to a fan (01-65-1 and 01-65-2), which removes the crushed products by suction and routes them to the decantation cyclones (01-66-1 and 01-66-2), from which the crushed, perfectly clean product may be removed. The extracted material is deposited directly in sacks below the cyclone hoppers. In view of the low density of these materials, the sacks should be as large as possible to facilitate handling and transport to a recycling centre for recovery.

Figure 3:
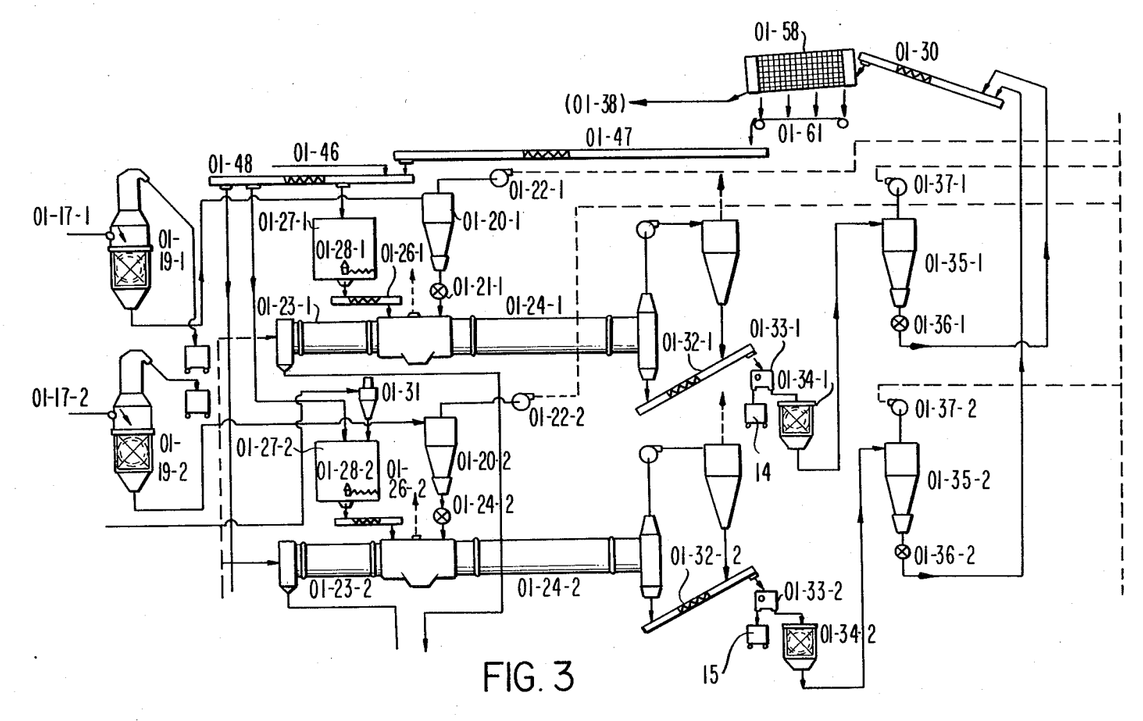
FIG. 3 shows all the equipment necessary for treatment of the combustible fraction, and its layout.

FIG. 3 shows that the conveyors (01-17-1 and 01-17-2) have been used to permit the hand-picking of certain constituents, such as thick plastics, glass and other objects unsuitable for subsequent treatment. As a result of these successive extractions, including magnetic separation, the combustible fraction constitutes only about 30% of the total refuse entering the final process. This residue of 30% is therefore routed to the hammermills (01-19-1 and 01-19-2) for primary treatment, the function of these hammermills being to remove any hard objects present in the combustible fraction.

Items small enough to pass through the grills at the bottom of the crusher are extracted by the fans (01-22-1 and 01-22-2) connected to the cyclones (01-20-1 and 01-20-2), from which the heavy particles are removed through rotary vane extractors (01-21-1 and 01-21-2).

These extractors discharge the product directly into the rotary driers (01-24-1 and 01-24-2), which are supplied with hot air by the rotary-type generators (01-23-1 and 01-23-2). These driers and generators are assembled in a single unit.

The generators are supplied with fuel, as will be discussed later.

The dried product is fed into the screws (01-32-1 and 01-32-2), which also receive the dust from the cyclones forming part of the extraction system for removal of air from the driers.

The screws (01-32-1 and 01-32-2) convey the products to box-type magnetic separators (01-33-1 and 01-33-2), whose function is to remove any small ferrous fragments, such as staples, still present in the dried combustible fraction. These small items are then deposited in the containers (14 and 15).

The material is transported from the separators (01-33-1 and 01-33-2) to the secondary crushing mills (01-34-1 and 01-34-2) containing hammers and grills in their lower section; the hammers reduce the dried combustible matter sufficiently for it to pass through the grills, i.e. 50 mm maximum.

The crushed product is extracted from these mills (01-34-1 and 01-34-2) by another pneumatic suction system, comprising fans (01-37-1 and 01-37-2) connected to decantation cyclones (01-35-1 and 01-35-2)

with special rotary vane extractors underneath (01-36-1 and 01-36-2). The two said cylcones, each forming part of a treatment line, feed the products onto the screw conveyor (01-30), which in turn charges a revolving screen (01-58) fitted with a 10 mm mesh rotary sizing grill which separates the two fractions and finished products into sized fractions:

(1) on the one hand, the principal fraction or residue on the revolving screen (01-58) is fed into the screw (01-38) (see FIG. 4), which conveys it, together with the material suitable for pelletization (description according to FIG. 4); and (2) on the other hand, the minus 10 mm fraction of the screened material consists of all the combustible matter less than this size and the rest of the organic matter.

The product collected on the conveyor (01-61) is relayed by the screw (01-47) to the screw (01-48). This latter screw has two discharge orifices through which the material is fed into the silos (01-27-1 and 01-27-2). The silos are fitted with planetary extractors (01-28-1 and 01-28-2), which in turn feed the screws (01-26-1 and 01-26-2). These screws feed fuel to the generators (01-23-1 and 01-23-2) connected to the driers (01-24-1 and 01-24-2). These generators use the fuel recovered as described above, but are also provided with auxiliary oil-burning equipment.

Figure 4:
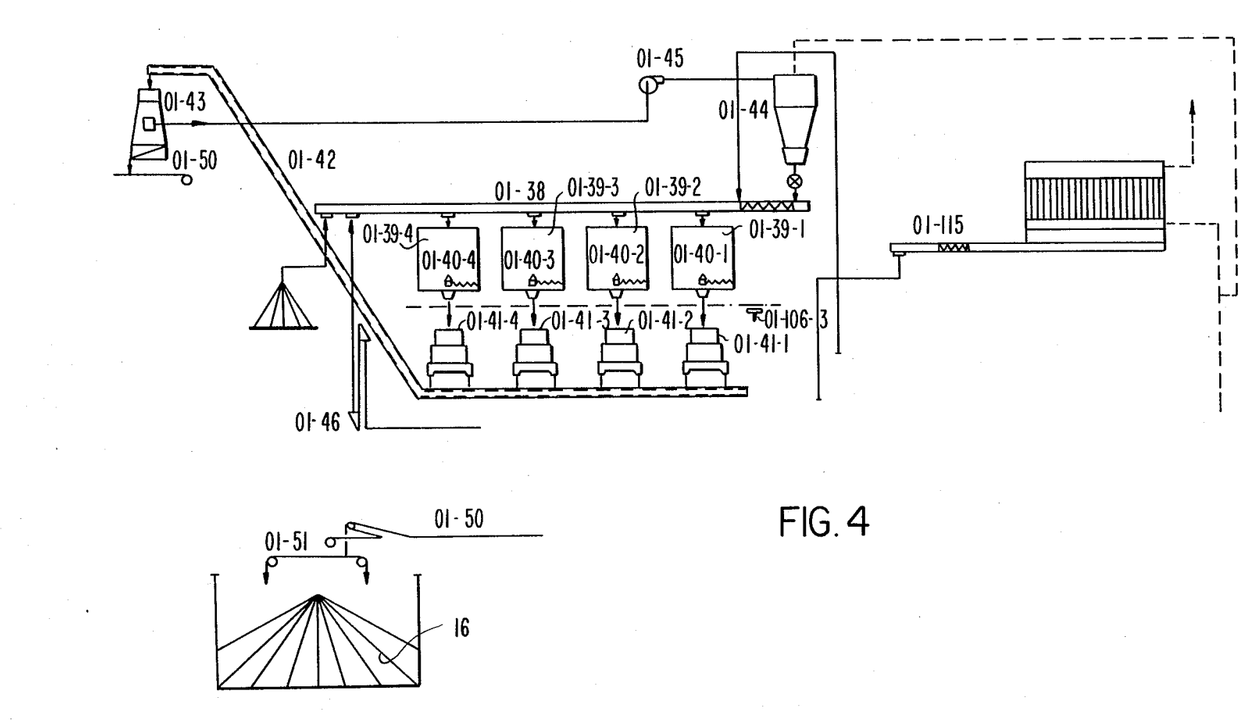
FIG. 4 illustrates the final phase of this process, and the equipment and installations required for the production and storage of the fuel pellets and for their re-use in the operation of the treatment factory.

FIG. 4 shows the continuation of the process for treatment of the previously purified and lightened fuel and the fraction used as fuel for the process itself, derived from the residue on the revolving screen (01-58) and conveyed by the screw (01-38), which in turn distributes the product to the storage silos (01-39-1, 01-39-2, 01-39-3 and 01-39-4). Each silo is equipped with a planetary extractor (01-40-1, 01-40-2, 01-40-3 and 01-40-4) which feeds the pelletization presses (01-41-1, 01-41-2, 01-41-3 and 01-41-4). The presses can be shifted by means of a travelling crane and hook (01-106-3).

It should be noted that only two of the four above-mentioned presses are operative, the other two being held in reserve. The storage capacity of the silos (01-39-1, 01-39-2, 01-39-3 and 01-39-4) allows the so-called "pelletization phase" to be carried out independently of any preceding phases of the treatment process. The presses deliver the processed pellets into the bucket conveyor (01-42), which feeds the vertical cooler (01-43), which in turn feeds the conveyor (01-50), fitted with a mobile wagon aligned with the axis of the storage depot for the pelletized fuel.

This wagon charges an oscillating conveyor (01-51), which allows the fuel to be deposited easily in uniform heaps (16). In cases where the screw (01-48) can not feed the silos, it is provided with a sixth orifice through which the fuel may be discharged for transport to a storage area where it may be completely recovered. In addition to this sixth orifice, there is a fifth opening, through which the material may be loaded into the vertical feeder (01-46) and from there into the said screw (01-48), previously described in FIG. 2.

The said feeder charges the silos (01-27-1 and 01-27-2). These silos in turn feed the generators connected to the driers (01-24-1 and 01-24-2), depending on the quantity of material in the silo (01-27-3) supplying fuel to the generator (01-69) for the organic fraction drier (01-70), whose function will be described separately (see FIG. 5).

FERMENTATION OF THE ORGANIC FRACTION

Figure 5:
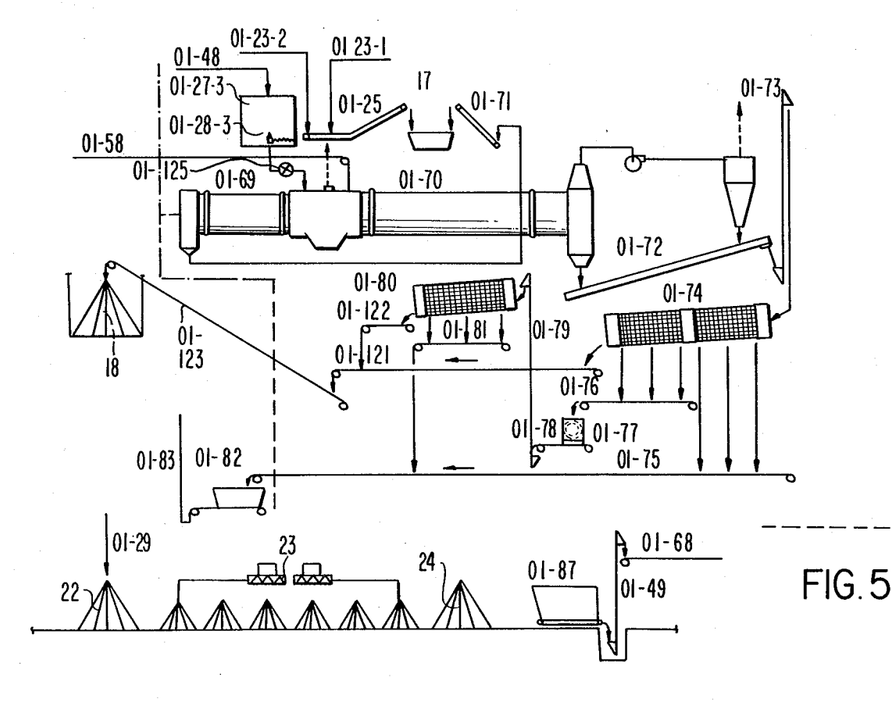

FIG. 5 shows some details of the fermentation process which the organic fraction (22) undergoes after separation from the rest of the refuse and transferral to the transformation area (23). This area is fed by the conveyor (01-61) (see FIG. 1). After fermentation, this material is brought back on the conveyor (01-68). This latter phase is not the object of the present invention.

DRYING AND REFINING OF THE ORGANIC FRACTION

The refined compost undergoes a final refining treatment described below.

The material is loaded onto a ballast hopper truck (01-67) with a mobile floor, situated above a conveyor, which provides a constant supply to the treatment line. The conveyor deposits the material in a bucket elevator (01-49), which in turn empties it onto the conveyor (01-68). This conveyor enters the upper section of the plant. Its function is to charge the rotary drier (01-70) connected to the rotary generator (01-68), which is fed with fuel by the planetary extractor (01-28-3) and the feed lock (01-125). These items have already been described under treatment of the combustible fraction. It should be noted that the ash from combustion in this generator is removed by a chain conveyor (01-71) and emptied into a container (17) in which products carried by the conveyor (01-25) are also deposited. This container (17) holds the ash from the generators (01-23-1 and 01-23-2) for the light fraction described with FIG. 3.

The dried compost is then collected in the screw (01-72), which also receives the products decanted by the cyclone collecting the dust produced by the drier (01-70).

Figure 6:
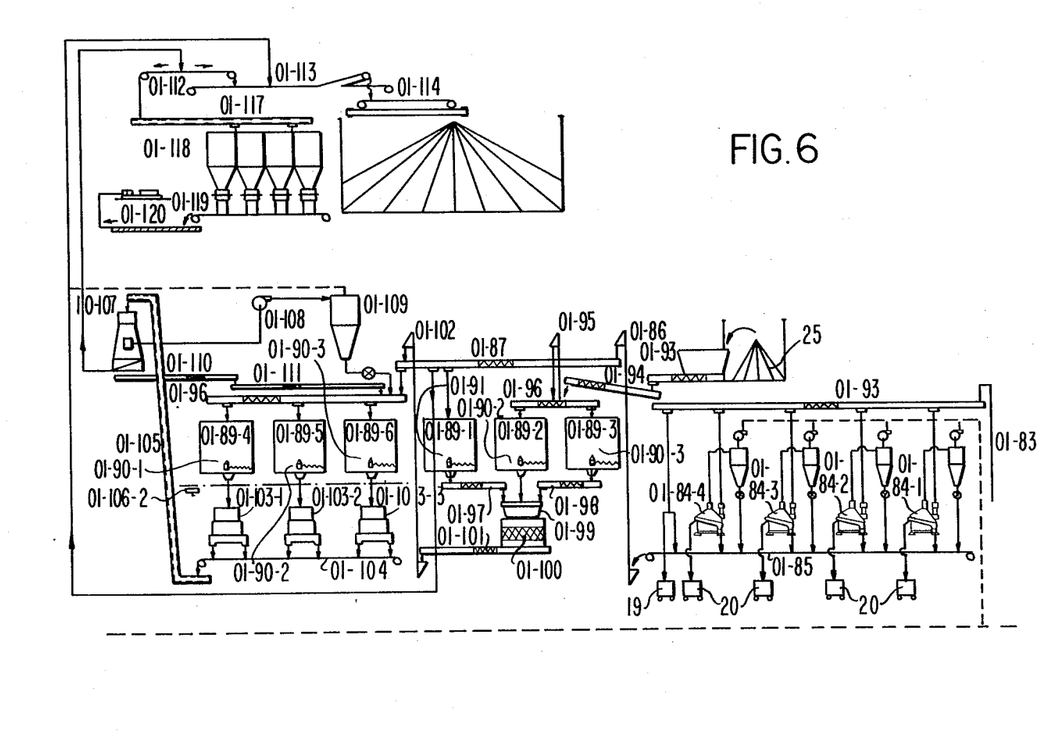

These products are then loaded into the bucket elevator (01-73), which discharges them into the revolving screen (01-74), comprising two sections:

(a) The first section, with a 15 mm mesh, separates the organic fraction and glass of the same size, prior to subsequent crushing phases, in order to facilitate separation of the glass from the other inert materials in the screens, as will be described with FIG. 6. With a previously dried product, this operation is highly efficient, and results in a considerable reduction in the load placed on the purification mill at a later stage. The fines from this section are collected on the conveyor (01-75) and transported to the hopper (01-82) connected to the screw (01-83) which feeds the screens.

(b) The second section of the revolving screen (01-74) has a 95 mm mesh screen. The fines fall on to the conveyor (01-76), which feeds the double-acting grinding mill (01-77). The ground product is collected on the conveyor (01-78), which tips it into a bucket chain (01-79). This chain feeds the revolving screen (01-80), which has a 15 mm mesh. The residue from this screen is collected by the conveyor (01-122), which discharges it onto the conveyor (01-121). This latter conveyor also receives the residue from the screen (01-74). The conveyor (01-121) discharges onto the conveyor (01-123), which transports the residue to a storage area (18), from which it is taken by truck to the public dumping ground.

Retracing part of the sequence of the process, it can be seen that the fines from the revolving screen (01-80) fall onto the belt (01-81). This conveyor discharges onto the belt (01-75), which already serves to transport the fines from the first section of the revolving screen (01-74) to the hopper (01-82).

It should also be noted that all products passing through the mill (01-77) end up on the belt (01-75). The screw (01-83) takes the material from the hopper (01-82) and distributes it to the four silos (see FIG. 6). Should the silos be full, the excess material may be discharged through a fifth orifice and stored. The four above-mentioned screens are numbered 01-84-1, 01-84-2, 01-84-3 and 01-84-4 in FIG. 6.

The grading operation results in separation of the following three products:
 (a) organic products
 (b) fine organic products
 (c) inert substances.

The first two products are collected in the containers (19), container 20 being reserved for glass. This invention treats glass as a mere waste product. In some cases, however, it may have a certain resale value.

After screening, the compost is collected on a conveyor (01-85), which carries it to a bucket elevator (01-86). This elevator transports it to a screw (01-87) provided with three orifices having the following important functions:
 (1) to route the powdered compost to the mixing and enriching system;
 (2) to route the powdered compost directly to the conveyor (01-113), which transports it to the organic fertilizer area; and
 (3) to route the powdered compost to the screw (01-88), which empties it into the silos (01-89-4, 01-89-5 and 01-89-6). These silos in turn feed the pelletization presses for the compost.

PELLETIZATION OF THE COMPOST

Pelletization may be carried out on either pure or enriched compost. In either case, the screw (01-88) feeds the product into the silo upstream of the pelletization presses. Each press (01-103-1, 01-103-2 and 01-103-3) has a capacity of 13 tonne/h, and is fed by a silo equipped with a planetary extractor (01-90-1, 01-90-2 and 01-90-3). The presses are handled by the travelling crane and hook (01-106-2). Generally, two presses operate simultaneously, the third being held in reserve.

The location of silos upstream of the storage area means that pelletization of the compost is an obvious corollary of the rest of the drying and refining process. After leaving the press, the pellets are collected on the conveyor (01-104) and carried to the bucket conveyor (01-105), which discharges them into the vertical cooler (01-107) and routed from there
 (a) to the sacking plant; and
 (b) to the bulk storage area by the conveyor (01-113), which is provided with a wagon and distribution platform (01-114).

The powder is removed from the cooler (01-107) by the screw (01-110) and brought onto the belt (01-111) by the screw (01-88), which distributes the powdered compost to the silos feeding the pelletization presses. The air is extracted from the cooler by the fan (01-108). The products separated by the cyclone are carried to the belt (01-88) through a rotary vane extractor.

ENRICHMENT OF THE COMPOST

In certain cases, the compost must be enriched for commercial purposes. A complementary plant is provided for this purpose, in which the compost is enriched with basic organic substances, usually the following:
 (a) potassium chloride, (b) potassium sulphate, (c) urea and (d) ammonium sulphate.

Local market requirements will determine the type of plant to be installed. The market survey should be carried out in the year of construction of the plant.

However, the proposed equipment offers potential for a wide range of variations and can be operated in conjunction with a complementary plant for incorporation of two or even three additives in the compost.

The fertilizer is generally sacked for resale. The various additives are stored in a sheltered site (25) in function of the finished products to be obtained from the silos. The fertilizer is loaded from the hopper with movable floor (01-93) into the screw (01-94), which feeds it to the bucket elevator (01-95). It is then tipped into the reversible screw (01-96), which discharges through two orifices into the silos (01-89-2 and 01-89-3). These two silos and the silo (01-89-1) which feeds them with powdered compost via the screw (01-81), constitute three adjustable feeders supplying the dosing machine (01-99) fitted with an electronic balance. The silo (01-89-1) discharges through the planetary extractor (01-91) and the screw (01-97). The silo (01-89-2) discharges directly through the planetary extractor (01-92-1), whereas the silo (01-89-3) discharges through the extractor (01-92-2) followed by the screw conveyor (01-98). The additives balance or dosing machine determines the mass of product required to obtain a precisely blended compost containing 3 or 4 additives. Once this quantity is determined, the balance automatically delivers the products into the discontinuous mixing machine (01-100), which then blends them with the compost. The mixing period is adjusted by a time-switch. On completion of mixing, the material is discharged into the screw (01-101), which transports it to the bucket elevator (01-102), which discharges it into the screw (01-87). This screw routes the product to the orifices for pelletization or bulk storage (21).

SACKING OF THE COMPOST

The product may be conveyed by the reversible conveyor (01-112) to the sacking plant or the storage plant.

The dosing plant begins at the screw (01-117), which distributes the product received from the conveyor (01-112), travelling in the direction of (01-112), into the multi-silos (01-118).

The filled sacks are then transported by the conveyor (01-119), which tips them onto a roller conveyor (01-120), from which they are handled and palletized by fork-lift truck.

What we claim is:
1. A process for treatment in a plant of municipal refuse as collected in sacks, which permits complete separation of the refuse into fractions of combustibles, vegetable matter, hard plastics, PVC, glass containers, ferrous scrap and inert substances, and comprising the following steps starting from a receiving pit for the refuse:
 (a) tearing the sacks open;
 (b) mixing the shredded municipal refuse;
 (c) charging a treatment line wherein the refuse undergoes primary separation to produce separated products including combustible and organic fractions;

(d) collecting some of the separated products as directly reuseable products; and (e) routing said combustible fraction and said organic fraction to lines for treatment, said treatment comprising separating a magnetic fraction from each of the combustible fraction and the organic fraction and separating the resulting magnetic fractions into two main components comprising cans and bottle caps.

2. A process in accordance with claim 1, further comprising providing the plant with a storage pit divided into two identical sections separated by a space in which are located treatment line feeders onto which the refuse can be unloaded; said sections of said pit having sloping floors to facilitate drainage of liquids secreted by the refuse into a collecting system adjacent to a wall facing the wall housing discharge doors; and extracting the highly polluted air in the storage pit by suction and conveying the extracted air through generators which supply driers, to prevent escape of smells and dust particles.

3. A process in accordance with claim 2, further comprising feeding the treatment lines by means of two autonomously operating travelling cranes with grappling hooks to supply the two lines independently.

4. A process in accordance with claim 3, further comprising discharging each initial feeder of the plant into shredders which function to grade and open refuse sacks, remove their contents and thoroughly mix the refuse sufficiently to ensure easy separation of refuse components in subsequent phases.

5. A process in accordance with claim 4, further comprising providing the shredders with fireproof systems to prevent explosions, and providing metallic conveyors located below the shredders to withstand shocks generated by operation of the shredder.

6. A process in accordance with claim 5, characterized in that the said conveyor feeds the revolving screen in which basic separation of the combustible and organic fractions is effected, the screen having 150 mm apertures.

7. A process in accordance with claim 6, further comprising beginning treatment of the organic fraction with removal of the magnetic objects and removal of all light objects less than 150 mm by pneumatic suction through an extraction orifice connected to a decanting cyclone and a rotary vane extractor; reintegrating the fraction so recovered into a combustible fraction circuit; and in this phase, hand-picking the whole of the combustible fraction to recover products such as dense plastics, PVC and glass.

8. A process in accordance with claim 7, characterized in wherein the magnetic fraction is treated by loading it onto an inclined conveyor belt travelling at a speed of approximately 3 m/s which effects selective gravitational separation of any plastics or papers remaining in the magnetic fraction at this stage; and wherein the magnetic fraction is introduced into a revolving screen in which the cans are cleaned by attrition.

9. A process in accordance with claim 8, wherein treatment of the dense plastics includes crushing and purification operations in knife mills and decanting cyclones.

10. A process in accordance with claim 9, wherein the combustible fraction, comprising about 30% of the refuse, enters a primary column-type hammermill, where it is crushed and hard objects are removed, the product passing through the grills at the bottom of the crusher with the aid of a rotary vane extractor attached to the cyclone is discharged directly into the rotary drier, which is fuelled by some of the product obtained, the dried product is discharged into a box-type magnetic separator to remove any small objects of magnetic materials still present in the dried combustible fraction, and the combustible fraction purified in this way enters the secondary crusher, which reduces the material to a suitable size prior to the final screening.

11. A plant for the treatment of municipal refuse as collected in sacks, permitting complete separation of combustibles, vegetable matter, hard plastics, PVC, ferrous scrap and inert substances, comprising, after a receiving pit for the refuse:

means for tearing open the sacks and thoroughly mixing the refuse;

means for feeding a treatment line with the refuse;

means for collecting and routing the separated products to lines whereby directly reuseable products may be recovered;

means to obtain a primary separation into a combustible fraction and an organic fraction; and means for treating said combustible fraction and said organic fraction to remove magnetic material from each of said combustible and organic fractions and means for separating each of said magnetic fractions into two main components comprising cans and bottle caps.

* * * * *